United States Patent [19]
Johnson

[11] Patent Number: 5,089,463
[45] Date of Patent: Feb. 18, 1992

[54] HYDRODEMETALATION AND HYDRODESULFURIZATION CATALYST OF SPECIFIED MACROPOROSITY

[75] Inventor: David R. Johnson, San Francisco, Calif.

[73] Assignee: Chevron Research and Technology Company, San Francisco, Calif.

[21] Appl. No.: 595,524

[22] Filed: Oct. 11, 1990

Related U.S. Application Data

[62] Division of Ser. No. 253,010, Oct. 4, 1988, Pat. No. 4,976,848.

[51] Int. Cl.$^5$ .................... B01J 21/04; B01J 23/85; B01J 23/88; B01J 32/00
[52] U.S. Cl. .................... 502/313; 502/314; 502/315; 502/322; 502/323; 502/332; 502/335; 502/439
[58] Field of Search .............. 502/254, 255, 256, 257, 502/313, 314, 315, 322, 323, 332, 335, 439

[56] References Cited

U.S. PATENT DOCUMENTS

| | | | |
|---|---|---|---|
| 4,066,574 | 1/1978 | Tamm | 502/314 X |
| 4,082,695 | 4/1978 | Rosinski et al. | 502/323 X |
| 4,434,048 | 2/1984 | Schindler | 208/216 PP |
| 4,435,278 | 3/1984 | Chen | 208/216 PP |

FOREIGN PATENT DOCUMENTS 23976 4/1986 Taiwan .

Primary Examiner—W. J. Shine
Attorney, Agent, or Firm—M. L. Davis; C. E. Rincon

[57] ABSTRACT

For a heavy hydrocarbonaceous feed, especially good hydrodemetalation and hydrodesulfurization are achieved, as well as MCR reduction, using a catalyst having 5 to 11 percent of its pore volume in the form of macropores, and a surface area greater than 75 m$^2$/g. Preferably the catalyst has a peak mesopore diameter greater than 165 Å, as determined by mercury porosimetry, and an average mesopore diameter greater than 160 Å.

13 Claims, No Drawings

HYDRODEMETALATION AND HYDRODESULFURIZATION CATALYST OF SPECIFIED MACROPOROSITY

This is a division of application Ser. No. 253,010, filed Oct. 4, 1988 now U.S. Pat. No. 4,976,848.

BACKGROUND OF THE INVENTION

The present invention relates to hydrodemetalation and hydrodesulfurization and to catalysts useful for simultaneously carrying out hydrodemetalation and hydrodesulfurization of a heavy oil feedstock. The invention relates to catalyst of certain pore characteristics, especially macroporosity characteristics, which have been found to be surprisingly effective in simultaneous hydrodesulfurization and hydrodemetalation of heavy oils.

U.S. Pat. No. 3,898,155 discloses a process for simultaneous demetalation and desulfurization of heavy oils containing at least 50 ppm metals under hydrogenation conditions using a catalyst composition comprising a Group VI metal and at least one Group VIII metal composited with a refractory oxide. The catalyst has 10 to 40 percent of its pore volume in macropores and from 60 to 90 percent of its pore volume in micropores, at least 80 percent of the micropore volume being in pores having a diameter of at least 100 A units, said catalyst composition further having a total pore volume of at least 0.5 ml per gram, an average pore diameter greater than 100 A units, and a surface area of at least 100 square meters per gram.

Taiwanese Patent No. NI 23,976, issued Apr. 16, 1986, discloses a process for demetalation and desulfurization of asphalt containing hydrocarbons under hydrogenation conditions employing a catalyst comprising molybdenum, at least one Group VIII metal, and alumina, the catalyst having a total pore volume based upon measurements by mercury penetration of at least 0.4 cc per gram, a macropore volume in the range of 5-50% of catalyst pore volume, and a mesopore volume of at least 0.12 cc per cc of catalyst volume.

U.S. Pat. No. 4,008,149 discloses a catalyst for use in hydrodesulfurization, hydrodemetalation and hydrodenitrification. The catalyst has a 250 to 300-m$^2$/g surface area, at least 80 percent of the pore volume in the range 0 to 150 Å, is from pores from 60 to 150 Å; less than 0.01 milliliters per gram of pore volume is from pores in the range 150 to 2000 Å; and the volume of the pores in the range 0 to 600 Å is between about 0.45 and 0.60 milliliters per gram of catalyst.

U.S. Pat. No. 4,301,037 discloses a bimodal alumina catalyst support having most of the surface area in a micropore region having pores of less than 500 Å, and also having a macropore region having pores with diameters of 1000 Å to 10,000 Å.

U.S. Pat. No. 4,225,421 discloses a bimodal catalyst for use in hydrodemetalation and hydrodesulfurization of a hydrocarbon feedstock containing asphaltenes and metals. The catalyst contains one active hydrogenation metal selected from Group VIB deposited on a support comprising alumina. The catalyst has a surface area within the range of about 140 to about 300 m$^2$/g, a total pore volume based upon measurement by mercury penetration within the range of about 0.4 cc/g to about 1.0 cc/g, and comprising about 60% to about 95% of its micropore volume in micropores having diameters within the range of about 50 Å to about 200 Å, 0% to about 15% of its micropore volume in pores having diameters within the range of about 200 Å to about 600 Å and about 3% to about 30% of said total pore volume based upon measurements by mercury penetration in macropores having diameters of 600 Å or greater.

U.S. Pat. No. 4,454,026 discloses a hydrotreating catalyst comprising a hydrogenating component and a support comprising at least one porous refractory inorganic oxide, the catalyst having a BET surface area of 150 to about 190 m$^2$/g, bulk density of at least about 0.2 grams per cc, total pore volume of at least about 0.9 cc/g with mercury penetration pore volume of at least about 0.1 cc/g and macropores with radii of 600 to 25,000 Å, such surface area, pore size distribution and total pore volume being effective to give an average pore diameter of at least 230 Å, calculated as 4 times the pore volume over the surface area.

SUMMARY OF THE INVENTION

According to the present invention, a process is provided for hydrodemetalation and hydrodesulfurization of a high-boiling point hydrocarbonaceous feed, which process comprises contacting the feed in the presence of hydrogen gas and at a temperature between 600° F. and 1000° F. and a pressure between 100 and 10,000 psig with a catalyst comprising a hydrogenation component selected from Group VI and Group VIII metals, and an inorganic oxide refractory support, and wherein the catalyst has a. 5 to 11 percent of its pore volume in the form of macropores, and
b. a surface area greater than 75 m$^2$/g of catalyst.

Preferably, the catalyst also has an average mesopore diameter greater than 160 Å. Still further, preferably the catalyst has a peak mesopore diameter greater than 165 Å as determined by mercury porosimetry.

Among other factors, the present invention is based on our finding that surprisingly good hydrodemetalation (HDM) and hydrodesulfurization (HDS) of heavy oil feedstocks are achieved using a catalyst wherein the macropore volume is within the relatively narrow range of 5 to 11 percent of the total pore volume of the catalyst, preferably within the range 6.5 to 10 percent of the pore volume of the catalyst, and the catalyst has a substantial surface area, above 75 m$^2$/g, preferably above 100 m$^2$/g, most preferably above 115 m$^2$/g. Also, we have found particularly good HDM and HDS is achieved when the catalyst has a peak pore diameter greater than 165 Å, more preferably, greater than 185 Å as measured by mercury porosimetry and an average mesopore diameter greater than 160 Å, preferably greater than 180 Å.

After extensive research, we have found that catalysts with lower macropore volume may have attractive hydrodesulfurization activity, but relatively lower hydrodemetalation activity and metals capacity. Further, we have found that when macroporosity is above the range for the catalyst used in the present invention, good hydrodemetalation activity and metals capacity may be maintained, but the sulfur removal activity drops off relatively rapidly. Also, when the macroporosity is greater than the range of the catalyst used in the present invention, the Conradson carbon [a measure of coke forming tendency, also expressed as Microcarbon Residue (MCR)] reduction ability of the catalyst drops off rapidly as a function of time.

Although the present invention is not to be limited by any theory of operation, a possible explanation in view of our findings is as follows: at low macroporosity (for example, below 6.5 percent, and especially below 5 percent), organometallic molecules cannot easily diffuse into the catalyst particle and react. Hence, the low activity and metals capacity for the low macroporosity catalyst. At high macroporosity, organometallic molecules more easily can diffuse into the catalyst particle. However, "poisons" in the feed also diffuse into the particle and deactivate the active sites for sulfur and MCR removal. We have found that at a macroporosity between 5 and 11 percent, and especially in the range 6.5 to 10 percent, there is a desirable balance in the hydrodemetalation activity and hydrodesulfurization activity as well as MCR removal activity. Organometallic molecules can diffuse relatively readily into the particle, but the "poisons" cannot as readily diffuse into the catalyst. Therefore, the catalyst has good hydrodemetalation activity and metals capacity as well as good activity for sulfur and MCR reduction. The "poisons" mentioned here are not well-defined, but are believed to be high-molecular weight molecules, possibly containing metals.

Using catalysts that are in accord with Taiwanese NI 23,976, provides good hydrodesulfurization and hydrodemetalation activity. However, use of the catalysts in accordance with the present invention has been found to provide generally superior combined hydrodesulfurization and hydrodemetalation activity. Catalysts in accordance with the aforementioned Taiwanese patent had a relatively large amount of macropore volume to achieve good hydrodemetalation activity and metals capacity. The catalyst had in the range of 25% of its pore volume from macropores. In order to achieve good hydrodesulfurization activity, perhaps requiring the exclusion of poisons from the catalyst pellet interior, the catalyst, in accordance with the Taiwanese patent, had mesopores which were relatively small, namely, about 110 Å. It is theorized that the relatively small mesopores were a main reason for the relatively lower hydrodemetalation activity compared to the hydrodemetalation activity achieved using catalyst in accordance with the present invention. This is illustrated further hereinbelow by Example 8.

Various methods may be used to make the catalysts employed in the process of the present invention provided the aforementioned parameters are achieved for the resultant catalyst.

One preferred method of making the catalysts of the present invention is comulling or cogelling the desired metals with an appropriate support materials, e.g., silica, alumina, etc., during preparation of the catalyst.

Another preferred method is to separately prepare the catalyst base or support material followed by impregnation with metals. Acid or base peptization methods can be used.

The percent of macropores in the catalyst can be adjusted using methods known in the art. Percent macropore volume is primarily dependent on two factors: the degree of mixing and the characteristics of the raw materials (such as alumina) used.

The degree of mixing depends on the specific equipment used, the time of mixing and the energy input by the mixer. In general, the percent of macropores can be reduced by increasing the degree of mixing. Conversely, less mixing leads to more macropores. Energy input during catalyst forming (e.g., extrusion) also affects the percent of macropore volume.

The type of raw material affects the percent of macropores produced. This can be illustrated by looking at changes in the dispersion characteristics of alumina (a common catalyst raw material). Aluminas have varying dispersibility indices (DI). The DI test procedure can be found in Kaiser Chemicals' Technical Service Bulletin No. 22. The DI measures the percent of alumina that is dispersed to less than 1 micron size under standard acidic test conditions. Crystallized aluminas, such as pseudo-boehmite, have a wide range of DI values (10–100). Those DI are generally higher than gamma-alumina or calcined aluminas (DI<10). In order to increase the percent of macropores in a catalyst or catalyst base, a lower DI alumina can be added; in order to decrease the percent of macropores in a catalyst or catalyst base, a higher DI alumina can be added.

Particularly preferred pore volume in the form of macropores for the catalyst used in the process of the present invention is in the range of 7.5 to 10 percent of the total pore volume of the catalyst. Most preferred macropore volume is about 8 to 9 percent of the total pore volume. Preferred refractory inorganic oxide supports for the catalyst used in the present invention include alumina, silica-alumina and silica. Alumina supports are especially preferred.

The catalyst used in the process of the present invention desirably contains a hydrogenating component, preferably a Group VI metal and/or a Group VIII metal. Especially preferred Group VI metals are molybdenum and tungsten, and molybdenum is most preferred. Preferred ranges for amounts of Group VI and Group VIII metals are summarized below:

|  | Group VI | Group VIII |
| --- | --- | --- |
| Preferred | 0–30 wt % | 0–15 wt % |
| More Preferred | 1–20 wt % | 0.5–10 wt % |
| Most Preferred | 2–10 wt % | 1–4 wt % |

Especially preferred Group VIII metals are nickel and cobalt, and nickel is most preferred.

The metals can be incorporated in the catalyst in various manners. One preferred means is impregnation onto the support.

The catalyst can be used in various reactor configurations, but preferably a fixed catalyst bed is used.

The catalyst shape and size are chosen so that diffusion limitation and reactor pressure drops are minimized. Preferably, the catalyst size is ⅛ to 1/100 inch in diameter, more preferably 1/18 to 1/40 inch in diameter, although the shape of the catalyst may be in various forms, including cylindrical pellets or spheres, or other shapes. Preferred catalysts are noncylindrical, quadrilobe shaped catalyst such as described in U.S. Pat. No. 4,394,303.

The feed to the process of the present invention preferably is a high boiling hydrocarbonaceous material having a normal boiling range mostly above 600° F.

Thus, the process of the present invention is basically directed to residuum feedstocks as opposed to gas oil feedstocks. Residua feeds typically have greater than 10 ppm metals, whereas gas oils nearly always have less than 10 ppm metals, for example, usually only as high as 1 to 4 ppm metals even for heavy vacuum gas oils. Thus, typical feedstocks for the present invention are crude oil atmospheric distillation column bottoms (reduced crude oil or atmospheric column residuum), vacuum distillation column bottoms (vacuum residuum) and solvent deasphalted residua. Very heavy gas oils may have greater than 10 ppm metals in which case the process of the present invention becomes applicable to gas oil feeds. However, a greater advantage is achieved in application of the present invention to feedstocks having greater than 20 ppm metals. Thus, I have found that the process of the present invention is most advantageously applied to residuum feedstocks which contain molecules of very high molecular weight and also greater than about 20 ppm metals. References to metals herein are by weight as the pure or elemental metal The metals are believed to be present as organometallic compounds, but the concentration of metals referred to herein is calculated as parts per million pure metal.

The contaminating metals in the feed typically include nickel, vanadium and iron.

Preferred feedstocks for the present invention preferably contain greater than 0.1% sulfur by weight. The sulfur is present as organic sulfur compounds and the wt. % sulfur is calculated based on elemental sulfur.

The process of the present invention is carried out at 600 to 1000° F., more preferably, 680° to 800° F. Preferred pressures are 100 to 10,000 psig, more preferably, 1000 to 3000 psig. Hydrogen to hydrocarbon feed rates are preferably 500 to 20,000, more preferably 2000 to 8000. Liquid hourly space velocity (LHSV) to the preferred fixed bed disposition of the catalyst particles is preferably from 0.01 to 10 $hr^{-1}$, more preferably from 0.1 to 2 $hr^{-1}$.

According to other embodiments of the present invention, a catalyst and catalyst base are provided in accord with the catalyst described above and having defined macroporosity, defined peak pore diameters and defined mesopore characteristics as described above. The catalyst base has substantially the same macroporosity peak pore diameter and mesoporosity as the catalyst described above, but does not have Group VI or Group VIII hydrogenation metals.

DETAILED DESCRIPTION

The pore size distribution and pore volume are as shown in the examples. Example 6 provides a description of mercury porosimetry and data obtained from it.

The term "macropores" is used herein to mean pores with pore diameters >1000 Å as defined by mercury porosimetry (ASTM D4284).

The term "mesopores" is used herein to mean pores with pore diameters in the range 35–1000 Å, as defined by mercury porosimetry. Mesopore Volume is determined by mercury porosimetry.

Average mesopore diameter is calculated for purposes of with the present invention as follows:

$$\text{Average Mesopore Diameter} = \frac{\text{Mesopore volume (cc/g)}}{\text{Surface Area (m}^2\text{/g)}} \times 40{,}000$$

Peak Mesopore Diameter = the maximum $\frac{dV}{dD}$ in the range 35–1000Å diameter;

The peak mesopore diameter, as calculated by mercury porosimetry depends on the assumed mercury contact angle. A contact angle of 140 degrees is used in all calculations whether for catalyst base or finished (metals-loaded) catalyst. Catalyst base components such as alumina, silica, and silica/alumina have a contact angle of approximately 140 degrees. The addition of metals to these catalyst support materials changes the contact angle. Nonetheless, in our calculations for the finished catalysts we assume a contact angle of 140 degrees. In this manner, the peak mesopore diameter for the preferred catalyst supports of this invention were found to be >145 Å, and the peak mesopore diameter for the preferred catalysts of this invention were found to be >165 Å, and, if anything, the mesopore diameter would become smaller. Thus, the greater than 165 Å diameter may be referred to as "apparent" diameter.

The term "surface area" is used herein to refer to surface area as measured by nitrogen adsorption using the BET method. Surface areas were determined using the well-known BET method using data from a Micrometrics Instrument Corp ASAP 2400, using nitrogen.

MCR is used herein to connote Microcarbon Residue as measured by ASTM D4530-85 test method. According to ASTM D4530-85, MCR is equivalent to Conradson Carbon.

Vanadium distribution factor is used herein to mean the ratio of the average metal concentration to the concentration at the maximum, typically at the edge of the catalyst particle. Since the distribution factor is obtained from electron microprobe analyses of catalyst samples removed after tests are completed, it represents a run average metal distribution. For simple first-order kinetics, the distribution factor is equal to the run average effectiveness factor. For other kinetic orders, the distribution factor is proportional to the run average effectiveness factor, if the maximum concentration occurs at the edge of the catalyst particle.

For most practical applications, the maximum concentration occurs at or near the particle edge. Therefore, a high distribution factor (approaching 1.0) means that the metalcontaining species penetrate further into the catalyst and deposit more uniformly in the pores. A low distribution factor (approaching 0) means the metals deposit preferentially near the edge of the catalyst pellet.

EXAMPLES

EXAMPLE 1

ACID PEPTIZATION OF ALUMINA TO MAKE THE MACROPOROUS CATALYST BASE 865 g of Kaiser Versal 250 alumina, an alumina having an acid dispersibility (DI value) between 20 and 28, was charged to a Baker-Perkins mixer and heated to 130°–140° F. with good mixing. After five minutes, 873 ml distilled $H_2O$ was added to the mixer slowly over 15 minutes. Then 13.9 g of conc. $HNO_3$ (70%) and 42 mL of distilled $H_2O$ was added. After eight minutes, 9.9 g of conc. $NH_4OH$ (58%) and 30 mL distilled $H_2O$ was added over three minutes, while maintaining the temperature at about 140° F. After 25 minutes, 859 g of Kaiser Versal 150 alumina, an alumina having a DI value between 10–20, was added into the mixer. Then 704 mL distilled $H_2O$ was added. After about 20 minutes, the mixture was cooled to about room temperature. After storing overnight, the material was extruded in a 2-inch Bonnott extruder using a 0.039-inch die with cooling water on the barrel. The catalyst was extruded and dried immediately at 250° F. for two hours and at 400° F. for two more hours. Finally, the catalyst base was calcined at 1700° F. for one hour with 1 CFH dry air.

The resulting catalyst base had the following properties:

| | |
|---|---|
| Particle Density | 0.94 g/cc |
| Skeletal Density | 3.4 g/cc |
| BET Surface Area | 146.8 m²/g |
| Mercury Porosimeter | |
| Total Pore Volume | 0.802 cc/g |
| Macropore Volume | 0.0612 cc/g |
| Macropores | 7.6% |
| Peak Mesopore Diameter | 192Å |
| Calc. Avg. Mesopore Diameter | 202Å |

EXAMPLE 2
IMPREGNATION OF THE MACROPOROUS CATALYST BASE

The catalyst base prepared in Example 1 was allowed to rehydrate in air overnight. 150 g of rehydrated base had a total pore volume of 129 cc. The impregnation solution was prepared by mixing and heating 88.9 g phosphomolybdic acid solution containing 15.6% Mo and 2.0% P to 40° C. Then, 30% hydrogen peroxide was added a drop at a time until the solution turned a clear, straw yellow color. Distilled water was added to increase the total volume to 97 cc. 7.44 g NiCO₃ (EM Science, 48.4% Ni) was added with stirring at 40° C. After foaming stopped, the solution was cooled to 30° C. and diluted to 129 cc with distilled water. The base was spray porefilled with the solution. The wet material was allowed to stand overnight, and the resulting catalyst was dried at 250° F. for one hour. The dry catalyst was calcined in a muffle furnace with 20 CFH dry air for six hours at 200° F., four hours at 450° F., four hours at 750° F., and five hours at 950° F.

The resulting catalyst has the following properties:

| | |
|---|---|
| Particle Density | 1.11 g/cc |
| Skeletal Density | 3.6 g/cc |
| BET Surface Area | 130.7 m²/g |
| Mercury TPV | 0.6167 |
| Mercury Macro PV | 0.0479 |
| Mercury Porosimeter | |
| Total Pore Volume | 0.802 cc/g |
| Macropore Volume | 0.0612 cc/g |
| Macropores | 7.8% |
| Peak Mesopore Diameter | 219Å |
| Calc. Avg. Mesopore Diameter | 174Å |

This catalyst is shown on Table II as Catalyst No. 3.

EXAMPLE 3
NH₄OH PEPTIZATION OF ALUMINA TO MAKE THE MACROPOROUS BASE

785 Grams of Davison SRA alumina was charged to a large Baker-Perkins mixer. 1800 ml distilled H₂O was mixed (146 cc) NH₄OH (58%) so that the resulting solution pH was 10.5. 1500 g of this solution was added into the mixer at 200 ml/min while mixing. After all the solution was added, the mixture was mixed for 10 more minutes. Then 785 g of Kaiser Versal 250 alumina was added into the mixture and mixed for another 50 minutes. Half the product was extruded in a 2-inch Bonnott extruder using a 0.039-inch die, with cooling. The extrudates were dried and broken into pieces of L/D of 2-3 and then put into a preheated Freas oven at 250° F. for 2 hours. Then the temperature was raised to 400° F. for 2 more hours. Finally, the catalyst base was calcined at 1700° F. for 1 hour in 1 CFH dry air. The properties of the resulting catalyst base are shown below.

| | |
|---|---|
| Particle Density | 0.87 g/cc |
| Skeletal Density | 3.4 g/cc |
| BET Surface Area | 142 m²/g |
| Mercury Porosimeter | |
| Total Pore Volume | 0.855 cc/g |
| Macropore Volume | 0.077 cc/g |
| Macropores | 9.0% |
| Peak Mesopore Diameter | 184Å |
| Calc. Avg. Mesopore Diameter | 219Å |

EXAMPLE 4
IMPREGNATION OF THE MACROPOROUS CATALYST BASE

The base of Example 3 was impregnated in a manner similar to the method of Example 2. The properties of the resulting catalyst are shown below:

| | |
|---|---|
| Particle Density | 1.053 g/cc |
| Skeletal Density | 3.706 g/cc |
| BET Surface Area | 130 m²/g |
| Mercury Porosimeter | |
| Total Pore Volume | 0.680 cc/g |
| Macropore Volume | 0.0621 cc/g |
| Macropores | 9.1% |
| Peak Mesopore Diameter | 215Å |
| Calc. Avg. Mesopore Diameter | 190Å |

This catalyst is shown on Table II as Catalyst No. 4.

EXAMPLE 5
CATALYST SUPPORT PREPARATION

865 Pounds Versal 250 alumina (DI=24) and 96 lbs micronized calcined alumina fines were mixed in a Littleford mixer with 17.5 lbs nitric acid in 650 lbs water over about 20 minutes. Mixing was continued for 15 minutes after all the liquid was added. Then 6 lbs of aqueous ammonia and 174 lbs water and then mixed for 5 minutes. This material was extruded in a 6-inch Bonnot extruder. Extrusion required about 1 hour. The extrudate was dried on a Proctor-Schwarz belt dryer at 200° C. for about 15 minutes and then calcined in stationary air at 900° C. for 1 hour.

The resulting catalyst base had the following properties:

| | |
|---|---|
| Particle Density | 0.89 g/cc |
| Skeletal Density | 3.44 g/cc |
| BET Surface Area | 137 m²/g |
| Mercury Porosimeter | |
| Total Pore Volume | 0.788 cc/g |
| Macropore Volume | 0.0544 cc/g |
| Macropores | 6.9% |
| Peak Mesopore Diameter | 184Å |
| Calc. Avg. Mesopore Diameter | 214Å |

EXAMPLE 6
PORE SIZE DISTRIBUTION BY MERCURY POROSIMETRY

The method used to determine the pore size distribution of catalysts, over the range of 35 Å to 20,000 Å microns is pore size distribution by mercury porosimetry.

The method is outlined below. It is related to ASTM D4284, "Pore Volume Distribution of Catalysts by Mercury Intrusion Porosimetry". A catalyst is heated at 450° C. in a vacuum for 30 minutes to remove water vapor and other volatiles. A weighed portion of sample (0.3–0.5 g, depending on the total pore volume estimate) is placed in the volume-calibrated sample tube. The tube is filled with mercury and inserted into the pressurization chamber of a Quantachrome Auto-Scan Porosimeter. The pressure in the chamber is increased from 0 to 60,000 psig. As the pressure increases, the volume of mercury in the sample tube appears to decrease as the mercury intrudes into the pores of the sample. Apparent mercury volume is obtained as a function of the applied pressure. Apparent mercury volume and applied pressure are then related to pore volume (V) and pore diameter (D), respectively. Results are reported as plots of pore volume (cc) and cumulative pore volume (cc) as functions of diameter (Å). Numeric pore size distribution information is also reported. Data obtained from analysis includes:

Total Pore Volume;
Mesopore Volume (volume in pores with 35–1000Å diameter);
Macropore Volume (volume in pores with >1000Å diameter);

% Macropore Volume $= \frac{\text{Macropore Volume}}{\text{Total Pore Volume}} \times 100\%$;

Peak Mesopore Diameter = the maximum $\frac{dV}{dD}$ in the range 35–1000Å diameter; and the differential pore volume versus diameter $\left(\frac{dV}{dD} \text{ vs. } D\right)$.

A contact angle of 140° is assumed for all calculations. The X (diameter) axis of the plot will be offset from the true values if the sample has any other contact angle with Hg. A contact angle of 140° is good for aluminum silica or silica/alumina materials. However, when metals are added (such as by impregnation and calcination), the apparent mesopore peak diameter increases by approximately 20 Å because the actual contact angle deviates from 140°.

EXAMPLE 7

CATALYST SCREENING TEST

Catalysts were tested using 120 cc of catalyst in a 1-inch ID upflow packed bed reactor in a hydroprocessing pilot plant.

The test conditions were:
2000 psig Total Pressure
0.75 LHSV
5000 SCF/Bbl Hydrogen Once-Through Gas
713° F. Catalyst Temperature (0–250 Hours)
755° F. Catalyst Temperature (250–700 Hours)

The feed was a residuum obtained from a blend of 23% Arabian Heavy crude and 77% Maya crude.

The feed properties (650° F.+Resid) were as follows:

| | |
|---|---|
| API Gravity | 9.8 |
| Sulfur, wt % | 4.4 |
| Nitrogen, wt % | 0.5 |
| Nickel, ppm | 66 |
| Vanadium, ppm | 350 |
| MCR, wt % | 16.8 |
| Viscosity at 100° C., cSt | 280 |
| D1160 650° F.−, | 2.2 |
| 650–850° F. | 23.9 |
| 850–1000° F. | 19.4 |
| 1000° F.+ | 54.4 |
| D1160 50 LV % | 1035° F. |
| VTGA 1000° F+, wt % | 58.5 |

At 700 hours, the demetalated and desulfurized product was analyzed to determine percent vanadium, sulfur and MCR conversion. The catalyst was examined to determine vanadium distribution factor.

Catalysts in accord with the present invention have been found to give the following results under the above test conditions:

| | |
|---|---|
| V distribution factor | >0.45 |
| V conversion | >75% |
| S conversion | >65% |
| MCR conversion | >38% |

EXAMPLE 8

COMPARISON CATALYST

This example compares a catalyst in accordance with Taiwanese Patent No. NI-23,976 to a catalyst in accordance with the present invention used in a hydrodemetalation/hydrodesulfurization application. Key properties of the catalyst and the resulting sulfur removal, MCR removal and vanadium removal, after 700 hours onstream, are given in Table I below.

TABLE I

| | Catalyst According to Taiwanese NI23,976 | Catalyst According to Present Invention (See Ex. 4) |
|---|---|---|
| % Macropore Volume | 25.3 | 9.1 |
| Peak Mesopore Dia., Å | 107 | 215 |
| Average Mesopore Dia., Å | 110 | 190 |
| % Conversion at 700 Hours | | |
| Sulfur | 74 | 68 |
| MCR | 41 | 40 |
| Vanadium | 67 | 76 |
| Vanadium Distribution Factor | 0.39 | 0.55 |

The high vanadium removal and the high vanadium distribution factor show the improved demetalation achieved with the catalysts prepared according to the present invention compared with other catalysts. This catalyst is shown on Table II as Catalyst No. 10.

EXAMPLE 9

PREPARATION OF CATALYSTS NO. 1, 2, 5, 6, 7, 8, 9

Other catalysts were prepared in a manner similar to Examples 1 and 2, or 3 and 4. The percent of macropores was adjusted by varying the types of aluminas, their DI values and the reaction conditions as described earlier. In this manner catalysts No. 2 and 5 of the invention were prepared. Also in this manner, comparative Catalysts No. 1, 6, 7, 8 and 9 were prepared.

Table II, below, summarizes the catalyst properties and test results. As can be seen in the Table, the catalysts of the present invention, Catalysts 2–5, have good vanadium conversions (>74% after 700 hours), and good vanadium distributions; these catalysts also have good sulfur conversions, >65% after 700 hours.

In general, catalysts with fewer macropores (Catalyst 1) give low vanadium conversion and low vanadium distribution factors, while catalysts with a greater percentage of macropores (catalysts 6-10) than the catalysts of this invention generally have lower sulfur conversions.

TABLE II

| | Catalyst | % PV >1000 Å | Peak Mesopore Dia., Å | Average Mesopore Dia., Å | BET Surface Area m²/g | % S Conv. (700 hrs) | % MCR Conv. (700 hrs) | % V Conv. (700 hrs) | V Distr. Factor |
|---|---|---|---|---|---|---|---|---|---|
| 1 | Low Macropore Cat. | 3.6 | 221 | 209 | 118 | 72.1 | 41.0 | 69.3 | 0.36 |
| 2 | Cat. in accord with invention, HNO₃ Peptization | 6.9 | 215 | 198 | 127 | 65.3 | 39.1 | 79.1 | (2) |
| 3 | Cat. in accord with invention, HNO₃ Peptization, Ex. 2 | 7.8 | 219 | 174 | 130 | 69.3 | 41.0 | 75.6 | 0.47 |
| 4 | Cat. in accord with invention, NH₄OH Peptization, Ex. 4 | 9.1 | 215 | 190 | 130 | 68.4 | 39.6 | 76.3 | 0.55 |
| 5 | Cat. in accord with invention, HNO₃ Peptization | 10.6 | 208 | 209 | 124 | 65.7 | 39.1 | 79.8 | (2) |
| 6 | 13% Macropore Cat. | 12.7 | 189 | 170 | 135 | 61.6 | 36.7 | 78.3 | 0.52 |
| 7 | 14% Macropore Cat. | 13.7 | 165 | 170 | 135 | 64.6 | 38.3 | 73.8 | 0.39 |
| 8 | 14% Macropore Cat. | 13.8 | 185 | 189 | 119 | 60.5 | 36.7 | 76.7 | 0.52 |
| 9 | High Macropore Cat. | 25.4 | 161 | 148 | 158 | 55.2 | 32.9 | 76.6 | 0.53 |
| 10 | Taiwanese Patent NI 23-976, Ex. 8 | 25.3 | 107 | 110 | 186 | 73.7 | 41.3 | 66.9 | 0.39 |

(1)Catalysts 2-5 are catalysts of the invention.
(2)Noncylindrical catalyst - V distribution factor could not be measured; very high V conversion shows that catalyst had good V distribution.

What is claimed is:

1. A hydrodemetalation/hydrodesulfurization catalyst comprising
a hydrogenation component selected from Group VI and Group VIII metals, and an inorganic oxide refractory support, and wherein the catalyst has
   a. 5 to 11 percent of its pore volume in the form of macropores, and
   b. a surface area greater than 75 m²/g of catalyst.

2. A catalyst in accordance with claim 1 wherein the catalyst has an average mesopore diameter greater than 160 Å.

3. A catalyst in accordance with claim 1 wherein the catalyst has its peak mesopore diameter of greater than 165 Å as determined by mercury porosimetry.

4. A catalyst in accordance with claim 1 wherein the macropore volume is between 6.5 and 10 percent.

5. A catalyst in accordance with claim 1 wherein the peak pore diameter is measured by mercury porosimetry is greater than 185 Å and when the average mesopore diameter is greater than 180 Å.

6. A catalyst in accordance with claim 1 wherein the support is alumina.

7. A catalyst in accordance with claim 1 wherein the Group VI metal is tungsten or molybdenum, and the Group VIII metal is cobalt or nickel.

8. A catalyst base comprising
   a. 5 to 11 percent of its pore volume in the form of macropores, and
   b. a surface area greater than 75 m²/g of catalyst base.

9. A catalyst base in accordance with claim 8 wherein the base has an average mesopore diameter greater than 160 Å.

10. A catalyst base in accordance with claim 8 wherein the base has its peak mesopore diameter at greater than 145 Å as determined by mercury porosimetry; and 11. A catalyst base in accordance with claim 8 wherein the macropore volume is between 6.5 and 10 percent.

12. A catalyst base in accordance with claim 8 wherein the peak mesopore diameter, as measured by mercury porosimetry, is greater than 165 Å and when the average mesopore diameter is greater than 180 Å.

13. A catalyst base in accordance with claim 8 wherein the base is alumina.

* * * * *